(No Model.)
W. K. EVANS.
SPINNING RING.
No. 272,868. Patented Feb. 27, 1883.
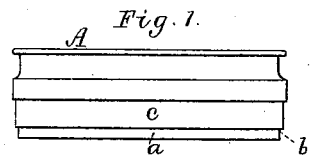
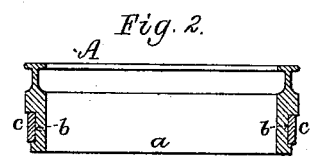
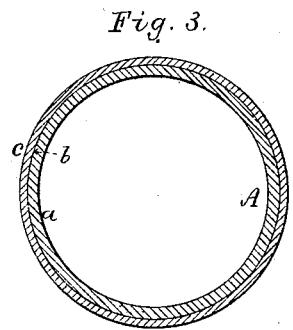
Witnesses.
S. N. Piper.
E. B. Pratt.
Inventor.
William K. Evans.
by R. H. Eddy atty.

United States Patent Office.

WILLIAM K. EVANS, OF BERKLEY, ASSIGNOR TO HIMSELF, AND JAMES Y. ANTHONY, OF TAUNTON, MASSACHUSETTS.

SPINNING-RING.

SPECIFICATION forming part of Letters Patent No. 272,868, dated February 27, 1883.

Application filed April 24, 1882. (No model.)

*To all whom it may concern:*

Be it known that I, WILLIAM K. EVANS, of Berkley, in the county of Bristol, of the State of Massachusetts, have invented a new and useful Improvement in Spinning-Rings; and I do hereby declare the same to be described in the following specification, and represented in the accompanying drawings, of which—

Figure 1 is a side view, Fig. 2 a transverse section, and Fig. 3 a horizontal section, of a spinning-ring containing my invention.

The body of the ring, instead of being of cast-iron or steel, is composed of glass, glazed earthenware, or porcelain, preferably of the latter The neck or shank of such body is encompassed by a metallic ring of soft metal, preferably what is termed "Babbitt metal" or "type-metal," or a composition of lead and tin. In making the ring, the body at the neck or shank thereof may be grooved to receive and hold the metallic ring; or such neck or shank may be notched to preserve the ring in place and prevent it from accidentally separating from the shank or turning around thereon, the metallic ring being cast or founded on the glass or glazed-earthenware body. The purpose of the metallic ring is not only to strengthen the spinning-ring of a material as described, but to prevent it from being crushed by the screw or screws used for confining it in the ring-rail of a spinning-frame. The soft-metal ring or re-enforce will readily yield to the pressure of the point of each of the confining-screws, and thus it will operate to prevent the breakage of the spinning-ring thereby. The re-enforce also will prevent the ring from breaking in case of it being dropped upon the floor. The metal ring may be turned on its outer surface cylindrical and eccentric to the race of the spinning-ring, and thus be used as a means of effecting adjustment of the ring or the race thereof into concentricity with the spindle. A spinning-ring having two races and made of glass, glazed earthenware, or porcelain may have arranged around its neck and between the two races a soft-metal ring or re-enforce, as set forth.

In the drawings, A denotes a spinning-ring, which is supposed to be made of glass, glazed earthenware, or porcelain, its neck or shank $a$ being grooved around it, and having cast in the groove $b$ or otherwise fixed thereon, a soft-metal ring, $c$, to encompass the shank.

In practice it has been found that a spinning-ring made of glazed earthenware, glass, or porcelain will not only resist wear of the traveler as well, if not much better, than will a ring of metal, but that it can be made very much cheaper, and when combined with a re-enforce of soft metal, as set forth, it can be used to great advantage and becomes very durable, and will not be easily broken or cracked by the means used in confining it in the socket of the ring-rail of a spinning-frame. Therefore

What I claim as my invention is as follows, viz:

As a new or improved manufacture, a spinning-ring made of glass or glazed earthenware or porcelain, and grooved in and around its shank or neck, in combination with a soft-metal ring, band, or re-enforce arranged in and around the groove, all being substantially as set forth.

WILLIAM K. EVANS.

Witnesses:
WM. H. FOX,
JAS. Y. ANTHONY.